United States Patent
Smith

(10) Patent No.: US 9,955,784 B1
(45) Date of Patent: May 1, 2018

(54) SYSTEM AND METHOD FOR MAKING A MOBILE OFFICE BUREAU WITH SIMULTANEOUS VIEWING RECHARGING STATION

(71) Applicant: Michael C. Smith, Marshall, TX (US)

(72) Inventor: Michael C. Smith, Marshall, TX (US)

( * ) Notice: Subject to any disclaimer, the term of this patent is extended or adjusted under 35 U.S.C. 154(b) by 0 days. days.

(21) Appl. No.: 15/446,365

(22) Filed: Mar. 1, 2017

(51) Int. Cl.
| | |
|---|---|
| *A47B 83/00* | (2006.01) |
| *F16M 11/42* | (2006.01) |
| *A47B 61/00* | (2006.01) |
| *A47B 83/04* | (2006.01) |
| *H02J 7/00* | (2006.01) |

(52) U.S. Cl.
CPC .......... *A47B 83/001* (2013.01); *A47B 61/003* (2013.01); *A47B 83/045* (2013.01); *F16M 11/42* (2013.01); *H02J 7/0027* (2013.01); *H02J 7/0044* (2013.01)

(58) Field of Classification Search
CPC ....... A47B 31/00; A47B 81/00; A47B 83/001; A47B 2031/003; A47B 2021/066; A47B 2200/0076; H02J 7/0027; H02J 7/0042; H02J 7/0044; G06F 1/1632; G06F 1/1628
See application file for complete search history.

(56) References Cited

U.S. PATENT DOCUMENTS

| | | | |
|---|---|---|---|
| 4,718,741 A | 1/1988 | Nichoalds | |
| 5,329,865 A | 7/1994 | McWard | |
| 5,330,263 A | 7/1994 | Wilkinson | |
| 6,086,073 A | 7/2000 | Tisbo et al. | |
| 6,218,796 B1 | 4/2001 | Kozlowski | |
| 6,493,217 B1 | 12/2002 | Jenkins, Jr. | |
| 6,722,673 B1 | 4/2004 | Hamlin | |
| 7,130,190 B1 | 10/2006 | Baker | |
| 7,201,611 B2 * | 4/2007 | Faranda | G06F 1/1632 439/540.1 |
| 7,252,302 B1 | 8/2007 | Thurn et al. | |
| 7,594,668 B2 | 9/2009 | Arceta et al. | |
| 7,595,995 B2 | 9/2009 | Hock | |
| 7,800,914 B2 | 9/2010 | Dully | |
| 7,826,220 B1 | 11/2010 | Baker | |
| 8,485,111 B2 | 7/2013 | Chinuki et al. | |
| 8,752,848 B2 | 6/2014 | Petrick et al. | |
| 9,337,674 B2 | 5/2016 | Wang | |
| 9,389,643 B1 | 7/2016 | Clark et al. | |
| 2008/0084147 A1 | 4/2008 | Brown | |
| 2009/0158973 A1 | 6/2009 | Felterman | |

(Continued)

*Primary Examiner* — Andrew M Roersma
(74) *Attorney, Agent, or Firm* — Hemingway & Hansen, LLP; D. Scott Hemingway

(57) ABSTRACT

This new desk bureau possesses a unique arrangement of components in a mobile and more satisfactory style for use in this modern era office environment, as well as a more economical method of fabrication of this unique and new desk bureau design. The invention also possesses more convenient outlet plugs for power and data outlets, which are often located in an inconvenient manner in prior art desk models. Not only can users access the outlet ports with ease, but multiple mobile devices and papers can be displayed on the present invention simultaneously while the devices can be recharged. Moreover, support horizontal planes allow for easy placement of baggage and briefcases, and internal storage bin areas are provided on a lower storage support unit.

41 Claims, 5 Drawing Sheets

(56) References Cited

U.S. PATENT DOCUMENTS

| | | | |
|---|---|---|---|
| 2010/0176762 A1* | 7/2010 | Daymude | H02J 7/0027 320/115 |
| 2011/0204757 A1 | 8/2011 | Komata et al. | |
| 2014/0124641 A1* | 5/2014 | Kassanoff | A47B 17/04 248/447 |
| 2015/0042281 A1 | 2/2015 | Marze et al. | |
| 2015/0272088 A1* | 10/2015 | Woodward | A01K 63/006 119/247 |
| 2017/0047751 A1* | 2/2017 | Fernandes | H02J 7/0044 |
| 2017/0201106 A1* | 7/2017 | Mecca | H02J 7/0044 |

* cited by examiner

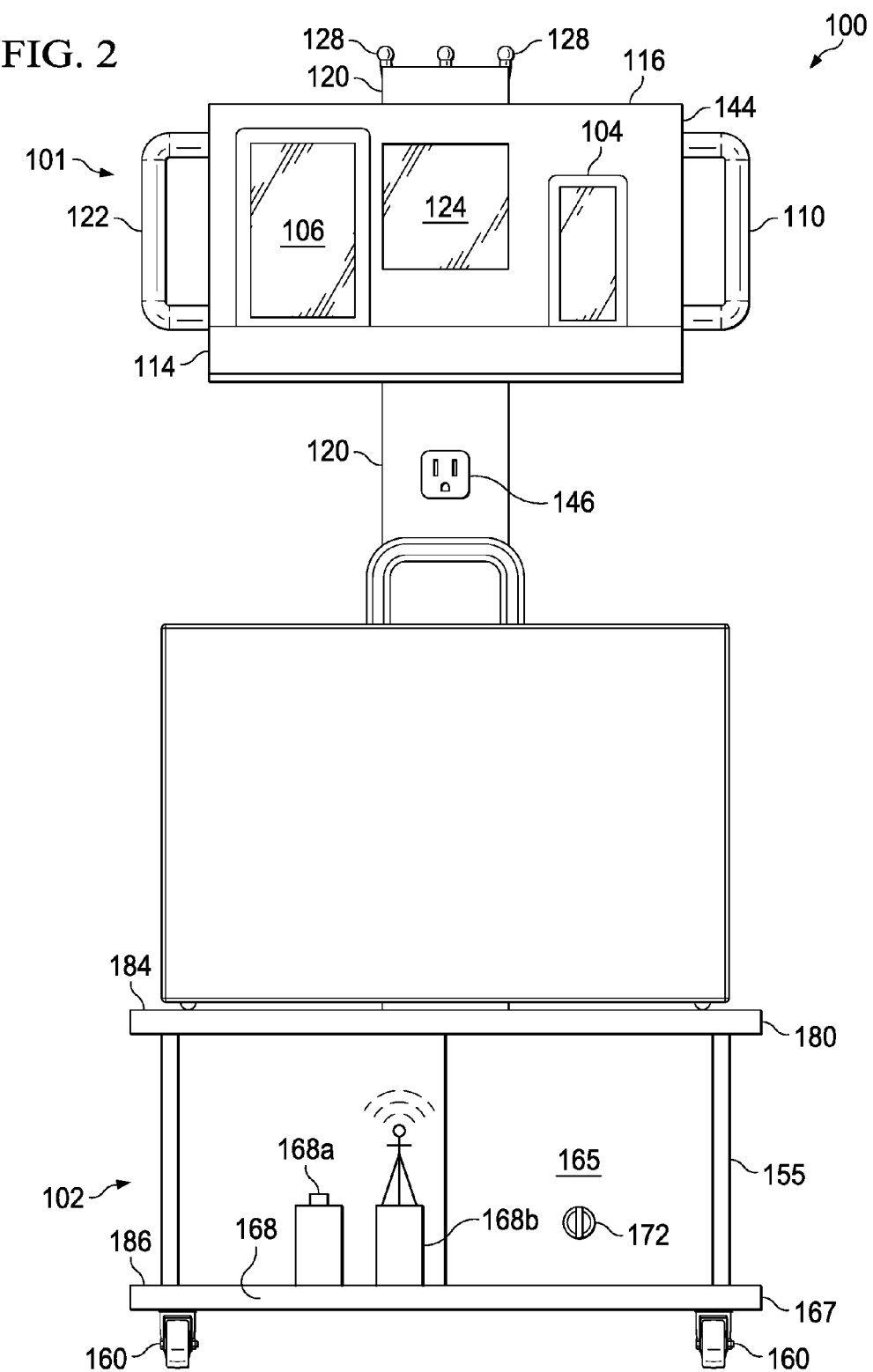

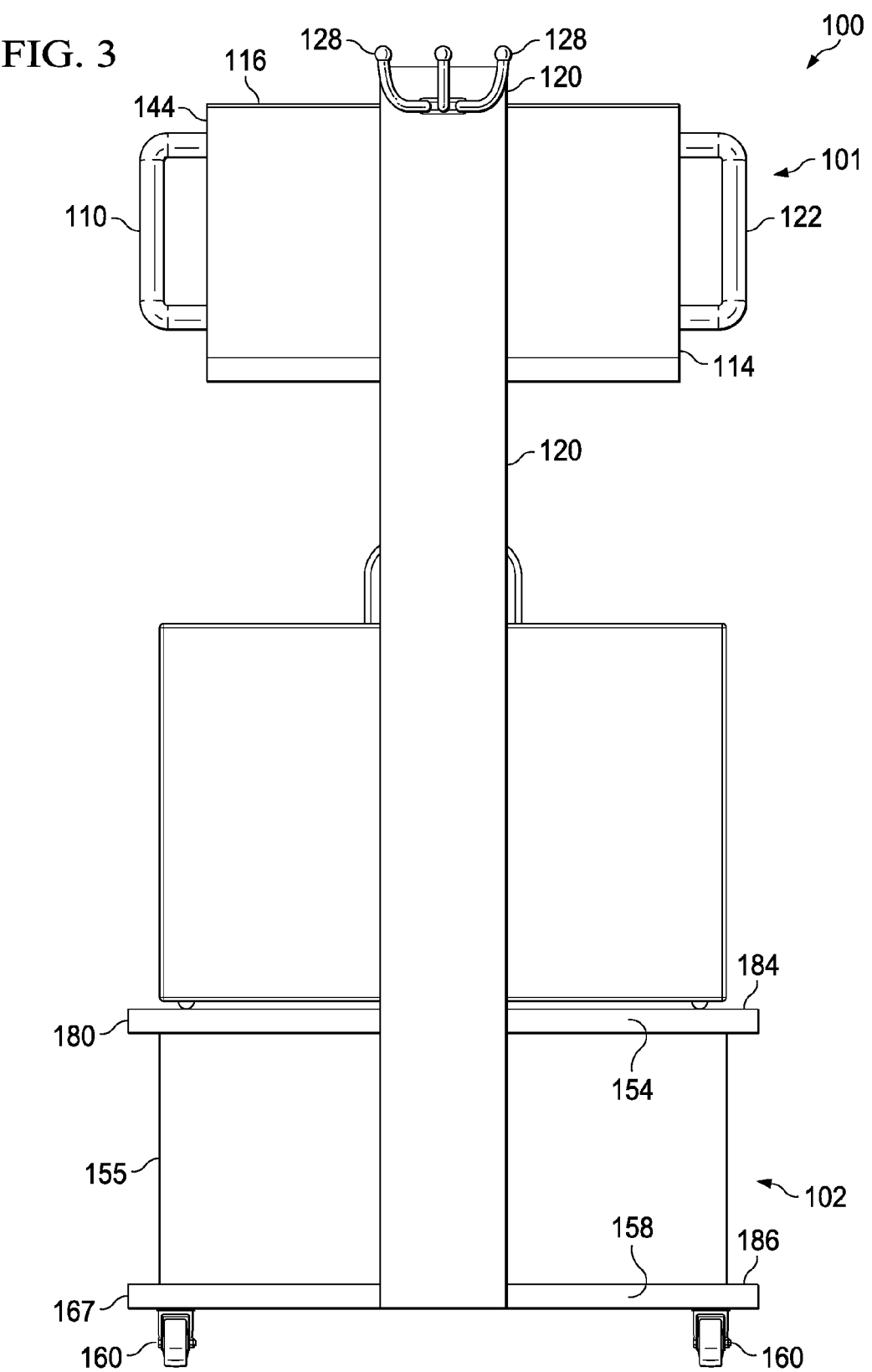

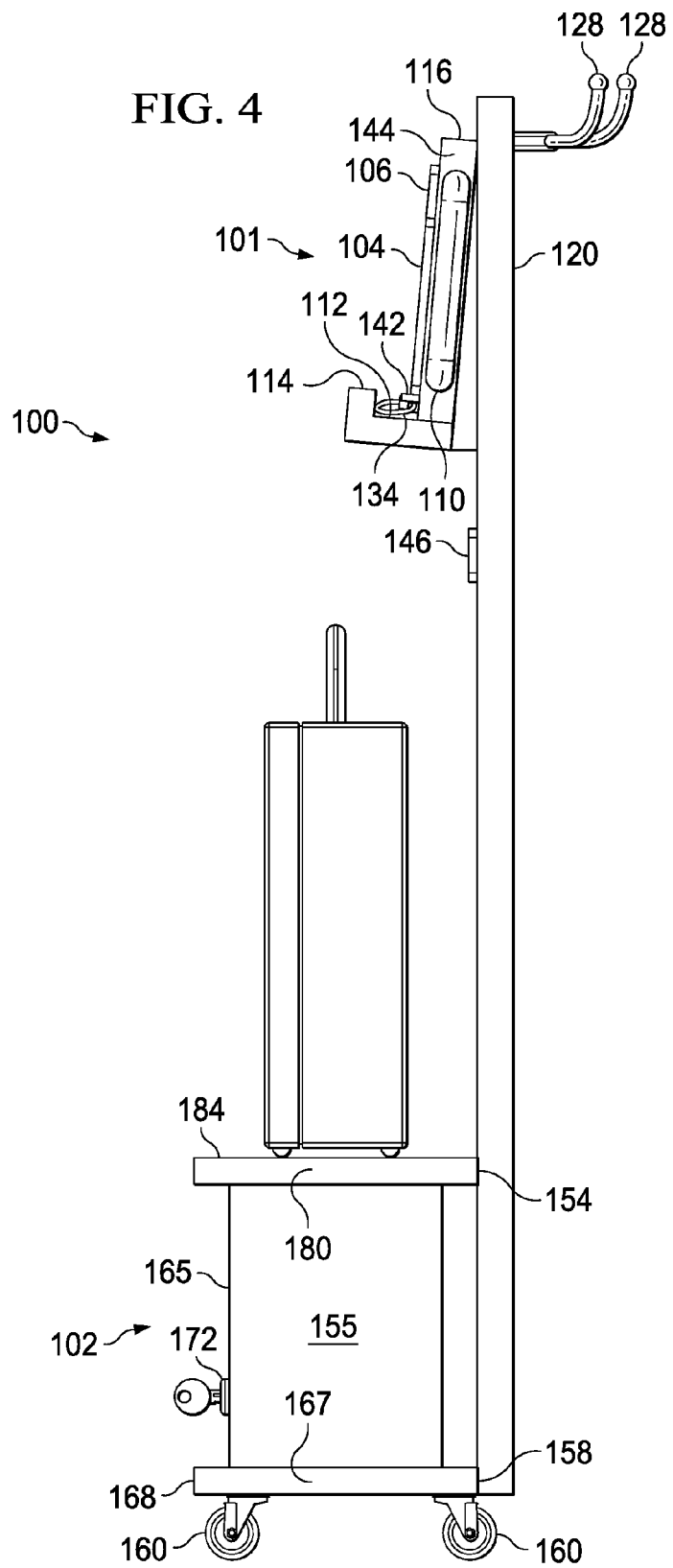

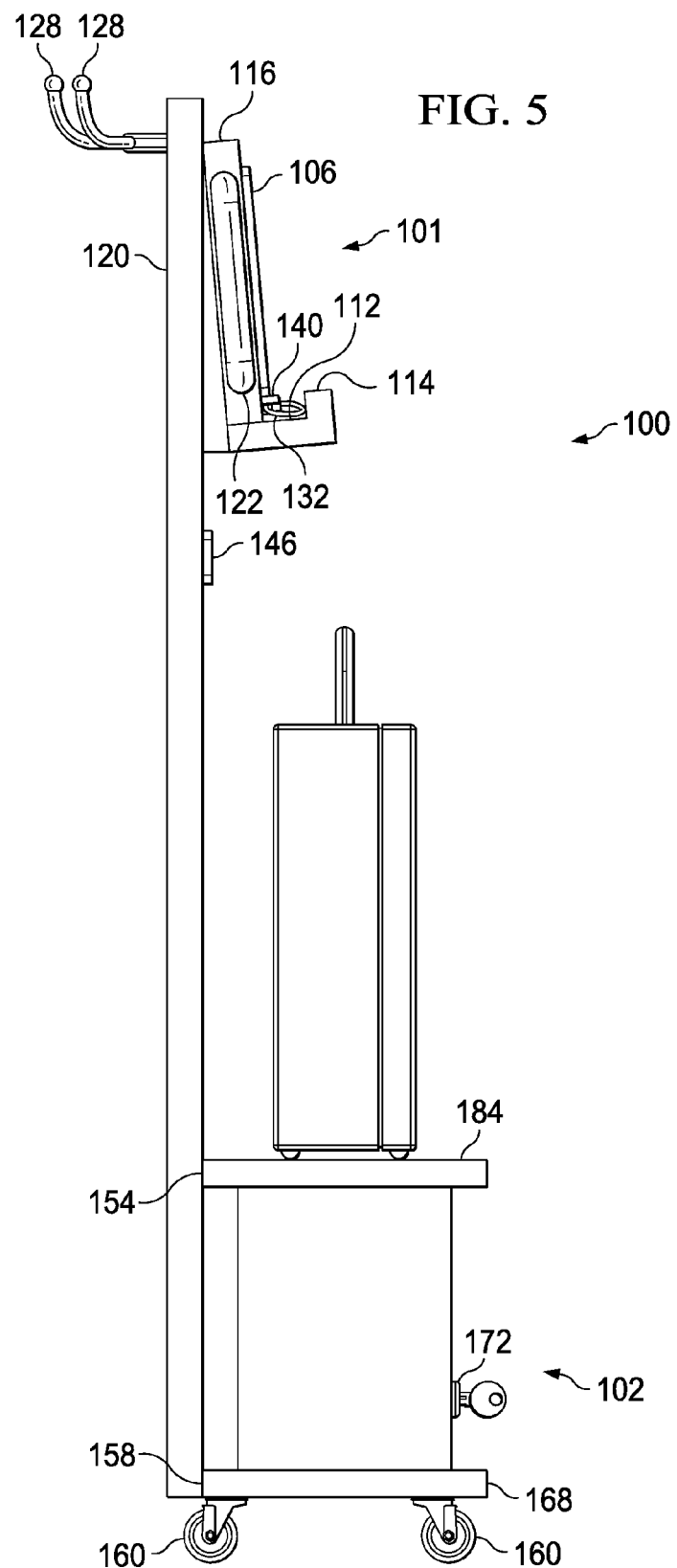

SYSTEM AND METHOD FOR MAKING A MOBILE OFFICE BUREAU WITH SIMULTANEOUS VIEWING RECHARGING STATION

TECHNICAL FIELD

The present invention relates to a system and method for making a mobile office bureau and hanging rack with recharging station capabilities.

RELATED APPLICATION DATA

Not Applicable.

BACKGROUND OF THE INVENTION

The background of this invention will address desks, bureaus, and peripheral computer and mobile device components.

Desks and Bureaus

The word "desk" originated from the Modern Latin word desca "table to write on," which is a mid-14th century word. "Desca" is a modification of the Old Italian desco for "table," from Latin discus for "dish" or "disc." A desk may refer, in general, to a bureau, counter, davenport, escritoire, lectern, reading stand, rolltop desk, school desk, workspace, or writing desk. In France, the bureau desk got its name (and, incidentally, so did the French word for "office," where the desk lived) from a traditional swath of dark red fabric that was draped across the top of a desk—in Latin, burrus, for red.

Described generally, a desk or bureau is a piece of furniture with a flat table-style work surface used in a school, office, home or the like for academic, professional or domestic activities such as reading, writing, or using equipment, such as a computer. Some desks have the form of a table, although there is usually one side of a desk that is suitable to sit at, unlike most kinds of tables. Most desks are sturdy so people can lean on them; and, in most cases, people sit at a desk either on a separate chair or a built-in chair (e.g., school desks). Some desks do not have the form of a table, such as an armoire desk-built within a large wardrobe-like cabinet, or a portable desk that is light enough to be placed on a person's lap.

Desk/Bureau Styles and Shapes

Desk-style furniture appears not to have been first used in classical antiquity or in other ancient centers of literate civilization in the Middle East or Far East. Medieval illustrations show the first pieces of desk or bureau furniture were designed and constructed for reading and writing. Since manuscript volumes were, at this time, very large and heavy, desks of the period usually had massive supporting structures.

As early as 1440, drawings also depicted scribes sitting at sloped desks working to make copies of manuscripts, books, and documents—before the press revolutionized things in the Renaissance. Desks after the Renaissance began to have relatively slimmer support structures, and more and more drawers were added as woodworking became more precise and cabinet-making became a distinct trade.

By Elizabethan and Jacobean times, the availability of printed material mandated a wider growth and more varied development of the desk. In Spain, Moorish-style writing cabinets called "varguenos" featured hinged tops on box-like stands, beautifully inlaid with silver, called "plateresque." The William & Mary period (and, in tandem, Colonial America) ushered in the development of spiral-turned legs, inlay wood, trumpet and vase-and-cup turning, brass fittings, x-shaped stretchers, molded edges, and carved skirts. Some desks-on-frames had box tops that could be removed from their frames and placed on the lap, or set on a larger table. Other bureau variations include flip-back tops, with less of an incline and storage beneath, or flip-down tops, which have more of an incline, and use the top for a desktop.

Developed during the William & Mary period, the bureau desk supported a bigger desk area and greater storage space, combining a slant-top box with a lower chest of drawers. Pull-out slides built in next to the top drawer supported the top. The bureau-style desk led to the use of pigeonholes, slots and drawers for placing different paper, pens, and letters, and these desks would be ornamented with a straight-front, serpentine-front, oxbow, block-front, or bowed-front.

Around 1660, the French conceived a bureau for formal writing called a "Mazarin," which featured a huge, flat top, a kneehole-style body with 3 drawers on either side, a bow front, and 8 legs—four per pedestal, often with curving, Baroque stretchers. Named after Louis XIV's principal minister, this was the first incarnation of the French-style "writing table," which had regal, vertical proportions and splendid brass inlay made famous by André Boulle. Simpler versions of the bureau Mazarin were imitated from Holland to Britain with tops inland with gorgeous marquetry.

The Rococo-style bureau plat ("flat desk") was developed with a table structure and a row of slender drawers, cabriole legs, and serpentine curves. These Rocco-style bureaus were status symbols for the aristocracy—beautifully outfitted pieces dedicated solely to the art of being educated.

Eventually, the Louis XVI style brought about the straight, tapered lines of Neoclassicism, and the bureau plat was modified to have the famous cylinder top with smaller versions for ladies of the house. The bureau plat remains a popular form of desk today, adjusting well to modern minimalism and chic offices.

The kneehole desk developed during fanciful, Rococo Chippendale period, possessed many of the Chippendale's signature details: block, flat, or serpentine fronts; oversized brass mounts; large ball-and-claw feet; and molded edges. These desks were easier to sit closer to the desk without having to turn to the side. The backs of the kneehole openings were either open, or closed—sometimes with a small cabinet built into the back. This Chippendale form of desk was incredibly popular in Victorian times, evolving into two other popular forms: the pedestal desks and the roll-top desk. A hallmark of this desk is its leather-covered top, which could be replaced and prevented scratches to the wood surface.

Some of the most beautiful writing desks came out of the Regency and Federal periods, with the lightness of Neoclassical forms married with rich veneers and elegant brass mounts. An incredibly decorative cylinder-top desk from France was subsequently designed during the Neoclassical period. A variation on both the knee-hole desk and the tambour secretary, the French cylinder desk features a solid barrel roll, or a tambour-style shuttered piece, that rolls horizontally into the back of the desk. A Sheraton-style cherry wood desk with a half-round shaped back and smooth, flat veneered front was also developed after the Chippendale era of desks. Another French desk made with women in mind was the bonheur-du-j our, a petite desk with a high row of little drawers across the back.

Into the 18th century, written material was more widely published and circulated, and desks grew to accommodate this increase in available published materials. The Latin word for "writer," secretarius gives us the title "secretary," which in turn is used to refer to this beautiful, formal piece of writing furniture. An American Federal-style secretary with a glazed cabinet top and a flip-forward writing surface was designed to rest on two pull-outs. The Federal-style tambour secretary was another variation, also called a "low secretary," noted for its sliding tambour shutters that conceal the upper level of drawers and pigeonholes. These secretaries were carefully crafted by applying thin slats of wood vertically to fabric—flexible, yet delicate.

In the Victorian period, secretaries were designed with upper elaborate china cabinets. More plain secretaries were also produced based on the philosophically driven Arts & Crafts style and popular Mission style. These Victorian era secretaries were heavy oak, with crude joinery, Medieval style hardware, and an overall "austere" feel.

The Resolute desk in the Oval Office has been used by many American presidents, including John F. Kennedy, Ronald Reagan and Barack Obama. Queen Victoria commissioned the desk from William Evenden, Royal Naval Dockyard at Chatham, England, and presented to President Rutherford B. Hayes in 1880. It is made from the timbers of the HMS Resolute, an abandoned British ship discovered by an American vessel and returned to Queen Victoria as a token of friendship and goodwill.

The famous Schoolmaster's desk was developed from the flip-back form in America during 1800s. Anna Breadin designed and patented a one-piece school desk in the late 1880s, which was built with a table section attached in front of a wooden seat and back rest. Before this development, most students in America sat either on chairs or long benches at long tables.

Refinements to these desk forms were made throughout the 19th century, as steam-driven machinery made cheap wood-pulp paper possible towards the end of the first phase of the Industrial Revolution. While limited quantities of finely-crafted desks have been continued to be constructed by master cabinetmakers for the homes and offices of the rich, the vast majority of desks after the Industrial Revolution were assembled rapidly by labor from components turned out in batches by machine tools. There is a long-felt, but unfulfilled need, for better and more satisfactory style and shape of desks and bureaus in this modern era.

Desk/Bureau Production Methods

Desks and bureaus are usually made of wood or metal, although materials such as tempered glass are sometimes used to fabricate a desk. Executive or management desks have become mass-produced articles built with plywood or fiberboard covered with wood finish. While woodworking enthusiasts can build their own versions, almost all modern desks are mass-produced in steel or wood for sale on the consumer market.

Modern mass-produced student desks are often made with laminate table tops and molded plastic seats in a combined single unit. Steel desks were introduced to take heavier loads of paper and withstand the pounding meted out on the typewriters. There is an unfulfilled need for better and more economical methods of fabrication of desks and bureaus in this modern era.

Advent of Personal Computers in Workplace

Until the 1980s, desks remained a place for paperwork, and the extensive use of paper and correspondence prior to the 1980s drove the need for more complex desks and more specialized desks, such as the rolltop desk, which was a mass-produced, slatted variant of the classical cylinder desk. "Business machines," such as personal computers began to be placed on top of desks in the 1980s and thereafter.

While the concept of a "paperless office" was considered as the next "future" development in the office work environment, the ease of printing personal documents and the discomfort involved with reading text on computer monitors continued to lead to a great deal of document printing. The need for paperwork space competed with the increased desk space taken up by larger computer monitors, CPUs, printers, scanners, and other peripherals. Replacement of bulky CRT monitors with flat panel LCDs freed up room on desktops, but the size of displays often increased to accommodate multiple on-screen windows, to display more and more information simultaneously. There is a long-felt, but unfulfilled need, for better space and economical uses of desk and bureau space and uses in this modern time.

Use of non-assigned or temporary office space in the modern office has changed how office furniture is used. For instance, visiting workers, such as guests, home office workers or other workers, may use temporary-assigned office space at a firm or other place of employment. Moreover, part-time workers, home workers, or associates may time-share the same office space at a place of employment by coming into the office on different work days or different times during the workday. These workers may not have dedicated office space or dedicated office furniture. There is an unfulfilled need to accommodate locked and unlocked storage, computer placement, power/data coupling and recharging, and clothes hanging for transitory and visiting office occupants.

With the introduction of desktop personal computer units into the office environment, desks began to be equipped with plug outlets for power and data plug-ins. Because a wide range of devices, from mobile telephones to wireless mice, have different connectors, power signaling, and the uses for such devices are not standardized. Moreover, connectors for power and data outlets are often located in an inconvenient manner without allowing users to easily access the ports with ease.

Various file folder type stands have been developed to place multiple thin mobile devices one on top of the other. Most multi-device charging and docking stations store a laptop, tablet and up to three other mobile devices like smartphones, cell phones or portable gaming devices, but these prior art systems tend to place the devices one on top of the other. One cannot see the screens of these devices simultaneously when placed in these types of stands, which is inconvenient. Also, desk space has become over utilized with desktop computers and desktop computer equipments, which leads to a need to provide for additional surfaces for computer and computer equipment placement outside the traditional desk unit. There is a long-felt, but unfulfilled need, to store mobile devices outside a traditional desktop, but on an auxiliary desk or bureau while simultaneously allowing the display of mobile devices or pad computers along with the need for easy access to power and data outlets so multiple mobile devices be viewed and charged simultaneously with each other.

SUMMARY OF THE INVENTION

This invention is a new desk bureau that possesses a unique arrangement of components in a mobile and more satisfactory style for use in this modern era office environment, as well as a more economical method of fabrication of this unique and new desk bureau design. The invention also possesses more convenient outlet plugs for power and data outlets, which are often located in an inconvenient manner in prior art desk models. Not only can users access the outlet ports with ease, but multiple mobile devices and papers can be displayed on the present invention simultaneously while the devices can be recharged. Moreover, the upper support horizontal plane allows for easy placement of baggage and briefcases, and internal storage bin areas are provided on a lower storage support unit. A railing, netting or other confinement wall may be placed around the periphery (or simply across the front peripheral edge) of the upper support plane to more securely position, and prevent placed baggage or briefcases from falling off of the upper support plane.

The internal storage bin area can be locked or unlocked storage, and this storage area may maintain an independent battery or power source as well as other electronics for radio (WiFi, cellular) communications with another network. If locked, the internal storage bin may be locked by a combination dial lock, a timed lock, a key lock, a padlock, or a number/character entry lock, which can make the internal storage bin a secure safe or locker space. Also, the independent battery source may power 110-120V, 5-14V (USB or equivalent), or 15-35V power supplies through the outlet plugs in the device and system.

The present invention is a mobile bureau, comprising a lower storage support unit and a vertical bureau stand. The lower storage support unit has: (1) a first horizontal planar support having a first width and a second length, a top surface and bottom surface and a third thickness, said top surface providing a location to position baggage or briefcases; (2) a second horizontal planar support having a fourth width and a fifth length, a top surface and bottom surface and a sixth thickness; and, (3) a left sidewall, a right sidewall, and a back sidewall, each of said left sidewall, right sidewall, and back sidewall being vertically positioned between the bottom surface of the first horizontal planar support and the top surface of said second horizontal planar support and proximate to the peripheral edge of said first and second horizontal planar supports thereby forming an internal storage bin area between said first and second horizontal planar supports; and, (4) a front panel vertically positioned between the bottom surface of the first horizontal planar support and the top surface of said second horizontal planar support and proximate to the peripheral front edge of said first and second horizontal planar supports to provide a closing door to the internal storage bin area defined by said left sidewall, right sidewall, and back sidewall, said front panel having a movement to open and close an access to the internal storage bin area.

The bureau has a vertical bureau stand made up of the following components: (1) a vertical support extending vertically upward from the back sidewall and the back of first planar support and back of the second planar support to a seventh height above the top surface of the first horizontal planar support, (2) an easel support stand located proximate to the top of said vertical support and having a tenth width, an eleventh height and a twelfth thickness, a front and back vertical surface, a top edge, a bottom edge, a left side edge and a right side edge, and having an adjustable angle of inclination, (3) said easel support stand having a plurality of intermediate support ledges located above the support ledge and on the front vertical surface of the easel support stand, said intermediate support ledges supporting the simultaneous placement of a plurality mobile devices in a manner to allow the simultaneous display of the corresponding display on each of said plurality of said mobile devices for view as positioned on the front vertical surface of said easel support stand.

The vertical support may be configured with a telescoping feature that is configured to extend and contract the height of the vertical support, which can raise or lower the easel support stand when the height of the vertical support is adjusted in this manner. Alternatively, or in combination with telescoping feature described above, the height of the vertical support can be fixed between thirty to seventy-two inches, and the easel support stand can be configured to slide or roll along the height of the vertical support to adjust the vertical position of the easel support stand. Using the telescoping feature of the vertical support, alone or in combination with the roller/slide feature of the easel support stand, allows the easel support stand to be positioned next to a table or desk, or alternatively adjusted upwardly to be positioned next to a higher table, bar or standing desk. The adjustable placement of the easel support stand next to a variety of desks allows the present invention to support tablets and telephones for viewing (or other written materials/books) next to the desk/table, and thereby maximize horizontal space on the desktop, table top or bar top by eliminating placement of those tablet and phone devices or written materials on those horizontal surfaces (while still allowing the worker to simultaneously view the displays on those devices).

The mobile bureau can have said intermediate support ledges possess at least one void in the intermediate support ledge to allow a connector for the plurality of said mobile devices to maintain connection with the plurality of mobile devices are still positioned screen out on the intermediate ledge of the front vertical surface of the easel support, where these connectors can be a data connector or a power connector. Moreover, the easel support stand can possess a separate computer or status display screen incorporated into the easel support stand for access to the Internet, display of emails or communications, status (time, date, weather, etc.) display, or word processing display. The screen could display advertising or be a firm business card holder. The back surface of the vertical bureau stand can be covered by a banner or other vertical covering that possesses a faux wood pattern, school or company logo, promotional material or another banner design. This banner or vertical covering can allow the back surface of the present invention to be positioned and placed in a manner that would serve as the front surface of a lectern that faces a group or audience when the easel support is turned in the opposite direction from the support surface on the easel support.

The present invention may also possess a plurality of castors on said bottom surface of said second horizontal planar support so the bureau can be moved in contact with the floor. Moreover, the front panel may have a lock to secure the front panel of the internal storage bin area. A hanging hook can be located on the back surface of said vertical bureau support for supporting clothing items to be positioned on the mobile bureau, or one or more hanging hooks can be located on the back surface of said vertical bureau support for supporting clothing items to be positioned on the mobile bureau.

A power outlet can be located on the front surface of the vertical bureau support in close proximity to the vertical bureau stand, or one or more power outlets located on the front surface of the vertical bureau support in close proximity to the easel support stand. A data outlet can be positioned on said front vertical surface of said easel support stand, or one or more data outlets can be positioned on said front vertical surface of said easel support stand. The data and power outlets may be coupled to the battery power source in the internal storage bin (or another power source)

or the radio transceiver components in the internal storage bin (or another data source to couple to another network or the Internet).

Movement of the front panel to the internal storage bin can be a sliding movement or a hinged pivot movement. One or more handles can be located on each of said left side edge and said right side edge, respectively, of said easel support stand for maneuvering the mobile bureau. Also, a support ledge can extend extends along the bottom edge of said easel support stand to vertically support the placement of documents in ledge area on the easel support stand for viewing and review.

A method of making the unique mobile bureau is also disclosed and claimed, said method comprising the steps of: (1) providing a first horizontal planar support possessing a first width and a second length, a top and bottom surface and a third thickness, (2) providing a second horizontal planar supports having a fourth width and a fifth length, a top and bottom surface and a sixth thickness; (3) vertically positioning and affixing a left sidewall, a right sidewall, and a back sidewall between the bottom surface of the first horizontal planar support and the top surface of said second horizontal planar support such that each of these sidewalls is located proximate to a side and back peripheral edge of said first and second horizontal planar supports to form an internal storage bin area between said first and second horizontal planar supports; (4) vertically positioning and affixing a front panel between the bottom surface of the first horizontal planar support and the top surface of said second horizontal planar support and proximate to a front peripheral edge of said first and second horizontal planar supports so as to provide a moveable door access to the internal storage bin area, (5) positioning a lower storage support unit as constructed by the above steps, said lower storage support unit having sides that correspond to the sidewalls and front panel and a top and bottom surface corresponding to the first and second horizontal planar supports, respectively; (6) affixing a vertical support stand having a front surface, a back surface, an eight thickness and a ninth width vertically upward from the back sidewall of the lower storage unit to a seventh height above the top surface of the first horizontal planar support, (7) affixing an easel support stand proximate to the top of said vertical support, said easel support stand having a tenth width, an eleventh height and a twelfth thickness, a front and back vertical surface, a top edge, a bottom edge, a left side edge and a right side edge, and having an adjustable angle of inclination, (8) positioning a plurality of intermediate support ledges on said easel support stand above the support ledge and on the front vertical surface of the easel support stand, said intermediate support ledges having an intermediate ledge bottom edge to vertically support the simultaneous placement of a plurality mobile devices in a manner to allow the simultaneous display of the corresponding display on each of said plurality of said mobile devices for view as positioned on the front vertical surface of said easel support stand.

The method of making the mobile bureau may also include the placement of intermediate support ledges have at least one void to allow a connector for the plurality of said mobile devices to maintain connection with the plurality of mobile device while still being positioned on the intermediate ledge of the front vertical surface of the easel support, where said connectors are data connectors or power connectors. A railing, netting or other confinement wall may be placed around the periphery (or simply across the front peripheral edge) of the upper support plane to more securely position, and prevent placed baggage or briefcases from falling off of the upper support plane. The method may also include the placement of a plurality of castors on said bottom surface of said second horizontal planar support so the bureau can be moved in contact with the floor, or the provision of a lock to secure the front panel of the internal storage bin area. If locked, the internal storage bin may be locked by a combination dial lock, a timed lock, a key lock, a padlock, or a number/character entry lock, which can make the internal storage bin a secure safe or locker space. Also, the independent battery source may power 110-120V, 5-14V (USB or equivalent), or 15-35V power supplies through the outlet plugs in the device and system.

The method of making the bureau may also include the placement of one or more hanging hooks located on the back surface of said vertical bureau support for supporting clothing items to be positioned on the mobile bureau, the placement of one or more power outlet located on the front surface of the vertical bureau support in close proximity to the easel support stand, or the placement of one or more data outlets positioned on said front vertical surface of said easel support stand.

The vertical support may be configured with a telescoping feature that is configured to extend and contract the height of the vertical support, which can raise or lower the easel support stand when the height of the vertical support is adjusted in this manner. Alternatively, or in combination with telescoping feature described above, the height of the vertical support can be fixed between thirty to seventy-two inches, and the easel support stand can be configured to slide or roll along the height of the vertical support to adjust the vertical position of the easel support stand. Using the telescoping feature of the vertical support, alone or in combination with the roller/slide feature of the easel support stand, allows the easel support stand to be positioned next to a table or desk, or alternatively adjusted upwardly to be positioned next to a higher table, bar or standing desk. The adjustable placement of the easel support stand next to a variety of desks allows the present invention to support tablets and telephones for viewing (or other written materials/books) next to the desk/table, and thereby maximize horizontal space on the desktop, table top or bar top by eliminating placement of those tablet and phone devices or written materials on those horizontal surfaces (while still allowing the worker to simultaneously view the displays on those devices).

The method of making the mobile bureau may also allow for the movement of the front panel to the internal storage bin is a sliding movement or a hinged pivot movement, and the method may allow for the placement of at least one handle located on each of said left side edge and said right side edge, respectively, of said easel support stand for maneuvering the mobile bureau, or the placement of a support ledge that extends along the bottom edge of said easel support stand to vertically support the placement of documents on the easel support stand for viewing and review. The back surface of the vertical bureau stand can be covered by a banner or other vertical covering that possesses a faux wood pattern, school or company logo, promotional material or another banner design. This banner or vertical covering can allow the back surface of the present invention to be positioned and placed in a manner that would serve as the front surface of a lectern that faces a group or audience when the easel support is turned in the opposite direction from the support surface on the easel support.

DESCRIPTION OF THE FIGURES

The above, and other objects and advantages of the present invention will be understood upon consideration of the following detailed description taken in conjunction with the accompanying drawings, in which like reference characters refer to like parts throughout, and in which:

FIG. 2. is a front view of my new Office Bureau and Hanging Rack design;

FIG. 3. is a back view of my new Office Bureau and Hanging Rack design;

FIG. 4 is a left side view of my new Office Bureau and Hanging Rack design; and, FIG. 5 is a left side view of my new Office Bureau and Hanging Rack design.

Figure 1:
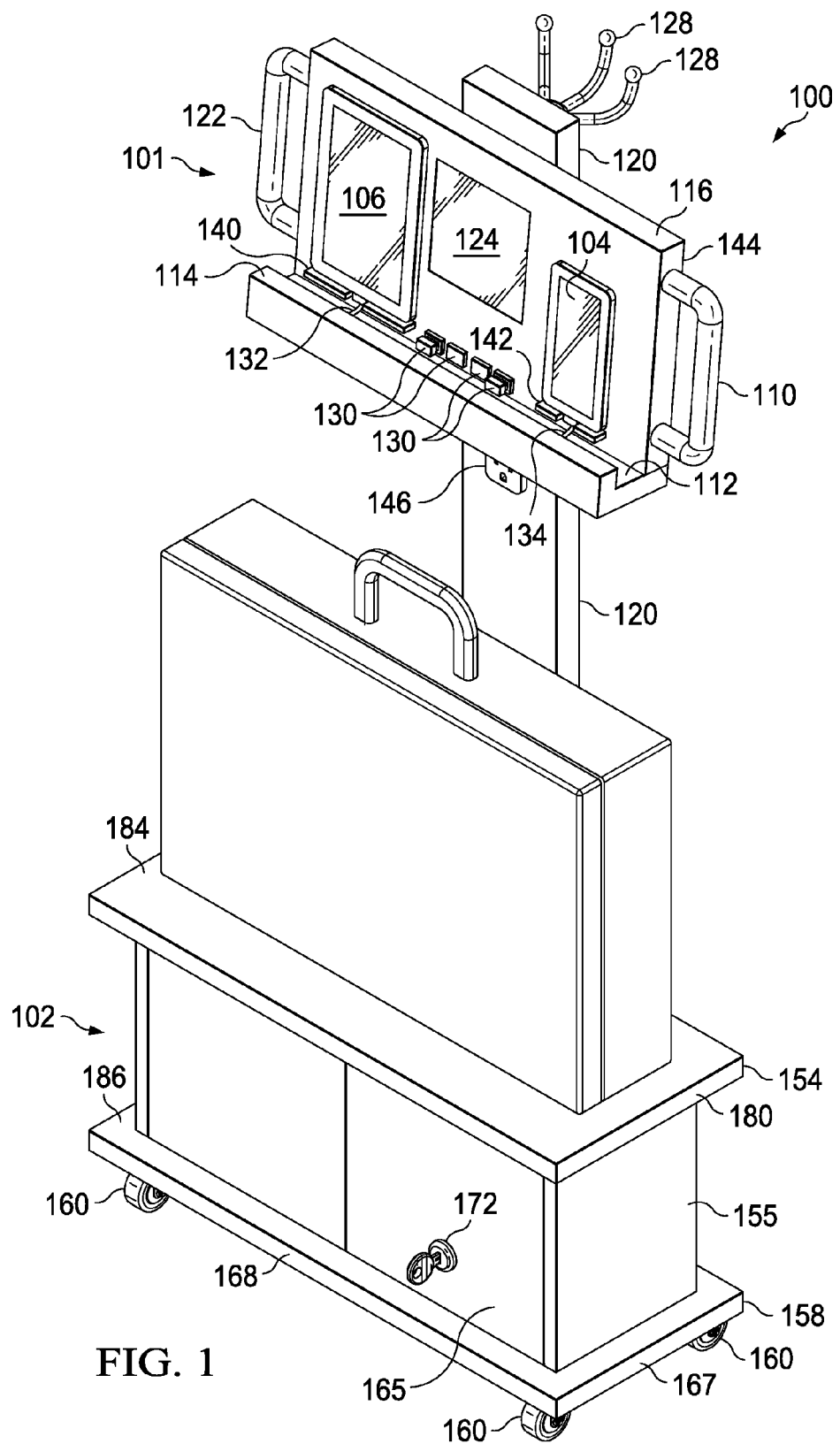
FIG. 1 is a perspective view of my new Office Bureau and Hanging Rack design.

The inventor will use descriptive drawings and text to describe the device and how it functions. While the invention is susceptible to various modifications and alternative forms, specific embodiments thereof have been shown by way of example in the drawings and are herein described in detail below.

DETAILED DESCRIPTION

This invention is a new mobile bureau 100 that possesses a unique arrangement of components in a mobile and more satisfactory style for use in this modern era office environment, as well as a more economical method of fabrication of this unique and new desk bureau design. The invention also possesses more convenient outlet plugs for power 146 and data outlets 130, which are often located in an inconvenient manner in prior art desk models. Locking storage with a lock 172 is a novel feature of this invention, where the internal storage compartment can maintain an independent battery or power source as well as other electronics for radio (WiFi, cellular) communication with other network, which all enhances the mobility of the present invention. Not only can users access the outlet ports 146, 130 with ease, but multiple mobile devices and papers can be displayed on the present invention simultaneously while the devices can be recharged. Moreover, support horizontal plane 184 allows for easy placement of baggage and briefcases, and internal storage bin areas are provided on a lower storage support unit 102.

This mobile bureau is well-equipped to accommodate visiting workers, such as office guests, home office workers in the office occasionally, or those who share office space, part-time workers, home workers, or associates on maternity leave. There is a change in office assignment practices where people do not work in assigned spots as much anymore, so work spaces need to accommodate frequent temporary occupation such as accommodating individual devices, clothing and hand baggage, coat racks, power cords, and easels. Moreover, the present invention provides locking storage, both for security for the temporary workers' belongings (a purse or other valuables) and security for the site as it would allow secure storage for firearms in the many jurisdictions where handguns are permitted to be carried, which is crucial for worker and location liability purposes. The present invention allows grouping for all of a temporary worker's personal paraphernalia in one location with the necessary security and power requirements met, so that the transitory or unassigned work can locate at any other desk or table location with the present invention. The present invention provides a separate station that frees the existing horizontal desktop and tabletop surfaces from computer devices and components, and the present invention allows for viewing of mobile devices in an improved manner.

As shown in FIG. 1-3, the present invention is a mobile bureau 100, comprising a lower storage support unit 102 and a vertical bureau stand 101. The lower storage support unit 102 has: (1) a first horizontal planar support 180 (upper support plane) having a first width and a second length, a top surface 184 and bottom surface and a third thickness, said top surface 184 providing a location to position baggage or briefcases (shown placed in FIG. 1-5); (2) a second horizontal planar support 167 having a fourth width and a fifth length, a top surface 186 and bottom surface and a sixth thickness; and, (3) a left sidewall, a right sidewall 155, and a back sidewall, each of said left sidewall, right sidewall 155, and back sidewall being vertically positioned between the bottom surface of the first horizontal planar support 180 and the top surface of said second horizontal planar support 167 and proximate to the peripheral edge of said first and second horizontal planar supports 180, 167 thereby forming an internal storage bin area between said first and second horizontal planar supports; and, (4) a front panel 165 vertically positioned between the bottom surface of the first horizontal planar support 180 and the top surface of said second horizontal planar support 167 and proximate to the peripheral front edge 168 of said first and second horizontal planar supports to provide a closing door to the internal storage bin area defined by said left sidewall, right sidewall 155, and back sidewall, said front panel 165 having a movement to open and close an access to the internal storage bin area. A railing, netting or other confinement wall may be placed around the periphery (or simply across the front peripheral edge) of the upper support plane to more securely position, and prevent placed baggage or briefcases from falling off of the upper support plane.

The bureau 100 has a vertical bureau stand 101 made up of the following components: (1) a vertical support 120 extending vertically upward from the back sidewall and the back 154 of first planar support 180 and back 158 of the second planar support 167 to a seventh height above the top surface of the first horizontal planar support 184, (2) an easel support stand 144 located proximate to the top of said vertical support 120 and having a tenth width, an eleventh height and a twelfth thickness, a front and back vertical surface, a top edge 116, a bottom edge, a left side edge and a right side edge, and having an adjustable angle of inclination, (3) said easel support stand 144 having a plurality of intermediate support ledges 140, 142 located above the support ledge 114 and on the front vertical surface of the easel support stand 144, said intermediate support ledges 140, 142 supporting the simultaneous placement of a plurality mobile devices 106, 104 in a manner to allow the simultaneous display of the corresponding display on each of said plurality of said mobile devices 106, 104 for view as positioned on the front vertical surface of said easel support stand 144.

The vertical support may be configured with a telescoping feature that is configured to extend and contract the height of the vertical support, which can raise or lower the easel support stand when the height of the vertical support is adjusted in this manner. Alternatively, or in combination with telescoping feature described above, the height of the vertical support can be fixed between thirty to seventy-two inches, and the easel support stand can be configured to slide or roll along the height of the vertical support to adjust the vertical position of the easel support stand. Using the telescoping feature of the vertical support, alone or in combination with the roller/slide feature of the easel support stand, allows the easel support stand to be positioned next to a table or desk, or alternatively adjusted upwardly to be positioned next to a higher table, bar or standing desk. The adjustable placement of the easel support stand next to a variety of desks allows the present invention to support tablets and telephones for viewing (or other written materials/books) next to the desk/table, and thereby maximize horizontal space on the desktop, table top or bar top by eliminating placement of those tablet and phone devices or written materials on those horizontal surfaces (while still allowing the worker to simultaneously view the displays on those devices).

The mobile bureau can have said intermediate support ledges 140, 142 possess at least one void in the intermediate support ledge 140, 142 to allow a connector 132, 134 for the plurality of said mobile devices 106, 104 to maintain connection with the plurality of mobile devices 106, 104 are still positioned screen out on the intermediate ledge 140, 142 of the front vertical surface of the easel support 101, where these connectors 132, 134 can be a data connector 130 or a power connector 146. Moreover, the easel support stand 144 can possess an separate computer or status display screen 124 incorporated into the easel support stand 144 for access to the Internet, display of emails or communications, status (time, date, weather, etc.) display, or word processing display.

The display 124 could also display advertising, or possess the capability of supporting a non-electronic display of a card or logo. The non-electronic display could be a business card or a card holder that would hold information on network codes and passwords, or advertising of the business. This display could also hold or support a hand-cast or other fabricated logo to go on the display shelf. There is also a type of wooden card holder that can hold a card with Wi-Fi network name and password. This area 124 is a good surface for information display. The back surface of the vertical bureau stand can be covered by a banner or other vertical covering that possesses a faux wood pattern, school or company logo, promotional material or another banner design. This banner or vertical covering can allow the back surface of the present invention to be positioned and placed in a manner that would serve as the front surface of a lectern that faces a group or audience when the easel support is turned in the opposite direction from the support surface on the easel support.

The present invention may also possess a plurality of castors 160 on said bottom surface of said second horizontal planar support 167 so the bureau can be moved in contact with the floor. Moreover, the front panel 165 may have a lock 172 to secure the front panel of the internal storage bin area. Locking storage with a lock 172 is a novel feature of this invention, where the internal storage compartment can maintain an independent battery 168a or power source 168a as well as other electronics for radio (WiFi, cellular) communication 168b with other network, which all enhances the mobility of the present invention. If locked, the internal storage bin may be locked by a combination dial lock, a timed lock, a key lock, a padlock, or a number/character entry lock, which can make the internal storage bin a secure safe or locker space. Also, the independent battery source 168a may power 110-120V, 5-14V (USB or equivalent), or 15-35V power supplies through the outlet plugs in the device and system. A hanging hook 128 can be located on the back surface of said vertical bureau support 120 for supporting clothing items to be positioned on the mobile bureau, or one or more hanging hooks 128 can be located on the back surface of said vertical bureau support for supporting clothing items to be positioned on the mobile bureau.

A power outlet 146 can be located on the front surface of the vertical bureau support 120 in close proximity to the vertical bureau stand 101, or one or more power outlets 146 located on the front surface of the vertical bureau support 120 in close proximity to the easel support stand 101. A data outlet 130 can be positioned on said front vertical surface of said easel support stand 144, or one or more data outlets 130 can be positioned on said front vertical surface of said easel support stand 144. The internal storage bin area can be locked or unlocked storage, and this storage area may maintain an independent battery 168a or power source 168a as well as other electronics for radio (WiFi, cellular) communications 168b with another network. The data and power outlets may be coupled to the battery power source 168a in the internal storage bin (or another power source) or the radio transceiver components 168b in the internal storage bin (or another data source to couple to another network or the Internet).

Movement of the front panel 165 to the internal storage bin can be a sliding movement or a hinged pivot movement. A battery 168a can be stored in the internal storage bin area, which could allow devices to be charged on the easel support stand 144 without impeding the portability of the unit. That portability is an important feature of the present invention, and eliminates the need to plug the unit into the wall during use. This eliminates the extension of cords between the invention and wall plugs, which eliminates that safety concern. One or more handles 110, 122 can be located on each of said left side edge and said right side edge, respectively, of said easel support stand 144 for maneuvering the mobile bureau. Also, a support ledge 114 can extend extends along the bottom edge of said easel support stand 144 to vertically support the placement of documents in ledge area 112 on the easel support stand 144 for viewing and review.

The easel support stand 144 can allow some laptop computers, ipods, ipads and mobile phones to be connected to the Internet or the local area network through the data connection, without sacrificing the mobile computing functionality of the machine. The top edge 116 can be moved vertically up and down, and slanted at various angles to improve viewing angles. Also, the depth of the ledge area 112 can be raised in distance to accommodate different materials and books of different variable sizes (i.e. rule book, phone book, tablet, etc.) These computer devices can dock and undock hot, cold or standby, depending on the capabilities of the system. In a cold dock or undock, one completely shuts the computer down before docking/undocking. In a hot dock or undock, the computer remains running when docked/undocked. Standby docking or undocking, an intermediate style used in some designs, allows the computer to be docked/undocked while powered on, but requires that it be placed into a sleep mode prior to docking/undocking.

As described herein with incorporation of the references shown in FIGS. 1-5, a method of making the unique mobile bureau is also disclosed and claimed wherein said method comprising the steps of: (1) providing a first horizontal planar support 180 (upper support plane) possessing a first width and a second length, a top surface 184 and bottom surface and a third thickness, (2) providing a second horizontal planar support 167 having a fourth width and a fifth length, a top surface 186 and bottom surface and a sixth thickness; (3) vertically positioning and affixing a left sidewall, a right sidewall 155, and a back sidewall between the bottom surface of the first horizontal planar support 180 and the top surface of said second horizontal planar support 167 such that each of these sidewalls is located proximate to a side and back peripheral edge of said first and second horizontal planar supports 180, 167 to form an internal storage bin area between said first and second horizontal planar supports 180, 167. The affixation or attachment of these panels and supports, as well as other components in this system, is accomplished by the use of glue, epoxy, nails, tacks or staples, and the supports, panels and easel structures can be composed of particle board, plywood, metal or hardwood, as well as synthetic boards, recycled sheet materials, polymer based or plastic-based materials. A railing, netting or other confinement wall may be placed around the periphery (or simply across the front peripheral edge) of the upper support plane to more securely position, and prevent placed baggage or briefcases from falling off of the upper support plane.

The present method continues with the following steps: (4) vertically positioning and affixing a front panel 165 between the bottom surface of the first horizontal planar support 180 and the top surface of said second horizontal planar support 167 and proximate to a front peripheral edge 168 of said first and second horizontal planar supports 180, 167 so as to provide a moveable door access 165 to the internal storage bin area, (5) positioning a lower storage support unit 102 as constructed by the above steps, said lower storage support unit 102 having sides that correspond to the sidewalls 155 and front panel 165 and a top and bottom surface corresponding to the first and second horizontal planar supports 180, 167, respectively; (6) affixing a vertical support 120 having a front surface, a back surface, an eight thickness and a ninth width vertically upward from the back sidewall of the lower storage unit 102 to a seventh height above the top surface 184 of the first horizontal planar support 180.

The present process continues with the following steps: (7) affixing an easel support stand 144 proximate to the top of said vertical support 120, said easel support stand 144 having a tenth width, an eleventh height and a twelfth thickness, a front and back vertical surface, a top edge, a bottom edge, a left side edge and a right side edge, and having an adjustable angle of inclination, (8) positioning a plurality of intermediate support ledges 140, 142 on said easel support stand 144 above the support ledge 114 and on the front vertical surface of the easel support stand 144, said intermediate support ledges 140, 142 having an intermediate ledge bottom edge to vertically support the simultaneous placement of a plurality mobile devices 106, 1004 in a manner to allow the simultaneous display of the corresponding display on each of said plurality of said mobile devices 106, 104 for viewing as positioned on the front vertical surface of said easel support stand 144.

The vertical support may be configured with a telescoping feature that is configured to extend and contract the height of the vertical support, which can raise or lower the easel support stand when the height of the vertical support is adjusted in this manner. Alternatively, or in combination with telescoping feature described above, the height of the vertical support can be fixed between thirty to seventy-two inches, and the easel support stand can be configured to slide or roll along the height of the vertical support to adjust the vertical position of the easel support stand. Using the telescoping feature of the vertical support, alone or in combination with the roller/slide feature of the easel support stand, allows the easel support stand to be positioned next to a table or desk, or alternatively adjusted upwardly to be positioned next to a higher table, bar or standing desk. The adjustable placement of the easel support stand next to a variety of desks allows the present invention to support tablets and telephones for viewing (or other written materials/books) next to the desk/table, and thereby maximize horizontal space on the desktop, table top or bar top by eliminating placement of those tablet and phone devices or written materials on those horizontal surfaces (while still allowing the worker to simultaneously view the displays on those devices).

The method of making the mobile bureau may also include the placement of intermediate support ledges 140, 142 have at least one void to allow a connector 132, 134 for the plurality of said mobile devices to maintain connection with the plurality of mobile devices 106, 104 while still being positioned on the intermediate ledge 140, 142 of the front vertical surface of the easel support stand 144, where said connectors are data connectors 130 or power connectors 146. The method may also include the placement of a plurality of castors 160 on said bottom surface of said second horizontal planar support 167 so the bureau can be moved in contact with the floor, or the provision of a lock 172 to secure the front panel of the internal storage bin area. If locked, the internal storage bin may be locked by a combination dial lock, a timed lock, a key lock, a padlock, or a number/character entry lock, which can make the internal storage bin a secure safe or locker space. Also, the independent battery source may power 110-120V, 5-14V (USB or equivalent), or 15-35V power supplies through the outlet plugs in the device and system.

The method of making the bureau may also include the placement of one or more hanging hooks 128 located on the back surface of said vertical bureau support 120 for supporting clothing items to be positioned on the mobile bureau, the placement of one or more power outlets 146 located on the front surface of the vertical bureau support in close proximity to the easel support stand 144, or the placement of one or more data outlets 130 positioned on said front vertical surface of said easel support stand 144.

The method of making the mobile bureau may also allow for the movement of the front panel 165 to the internal storage bin is a sliding movement or a hinged pivot movement, and the method may allow for the placement of at least one handle 110, 122 located on each of said left side edge and said right side edge, respectively, of said easel support stand 144 for maneuvering the mobile bureau 100, or the placement of a support ledge 114 that extends along the bottom edge of said easel support stand to vertically support the placement of documents on the internal groove 112 of the easel support stand 144 for viewing and review. The back surface of the vertical bureau stand can be covered by a banner or other vertical covering that possesses a faux wood pattern, school or company logo, promotional material or another banner design. This banner or vertical covering can allow the back surface of the present invention to be positioned and placed in a manner that would serve as the front surface of a lectern that faces a group or audience when the easel support is turned in the opposite direction from the support surface on the easel support.

As shown in FIG. 4-5, the present invention is a mobile bureau 100, comprising a lower storage support unit 102 and a vertical bureau stand 101. The lower storage support unit 102 has: (1) a first horizontal planar support 180 (upper support plane) having a first width and a second length, a top surface 184 and bottom surface and a third thickness, said top surface 184 providing a location to position baggage or briefcases (shown placed in FIG. 1-5); (2) a second horizontal planar support 167 having a fourth width and a fifth length, a top surface 186 and bottom surface and a sixth thickness; and, (3) a left sidewall, a right sidewall 155, and a back sidewall, each of said left sidewall, right sidewall 155, and back sidewall being vertically positioned between the bottom surface of the first horizontal planar support 180 and the top surface of said second horizontal planar support 167 and proximate to the peripheral edge of said first and second horizontal planar supports 180, 167 thereby forming an internal storage bin area between said first and second horizontal planar supports; and, (4) a front panel 165 vertically positioned between the bottom surface of the first horizontal planar support 180 and the top surface of said second horizontal planar support 167 and proximate to the peripheral front edge 168 of said first and second horizontal planar supports to provide a closing door to the internal storage bin area defined by said left sidewall, right sidewall 155, and back sidewall, said front panel 165 having a movement to open and close an access to the internal storage bin area. A railing, netting or other confinement wall may be placed around the periphery (or simply across the front peripheral edge) of the upper support plane to more securely position, and prevent placed baggage or briefcases from falling off of the upper support plane.

The bureau 100 has a vertical bureau stand 101 made up of the following components: (1) a vertical support 120 extending vertically upward from the back sidewall and the back 154 of first planar support 180 and back 158 of the second planar support 167 to a seventh height above the top surface of the first horizontal planar support 184, (2) an easel support stand 144 located proximate to the top of said vertical support 120 and having a tenth width, an eleventh height and a twelfth thickness, a front and back vertical surface, a top edge 116, a bottom edge, a left side edge and a right side edge, and having an adjustable angle of inclination, (3) said easel support stand 144 having a plurality of intermediate support ledges 140, 142 located above the support ledge 114 and on the front vertical surface of the easel support stand 144, said intermediate support ledges 140, 142 supporting the simultaneous placement of a plurality mobile devices 106, 104 in a manner to allow the simultaneous display of the corresponding display on each of said plurality of said mobile devices 106, 104 for view as positioned on the front vertical surface of said easel support stand 144.

As shown in FIGS. 4-5, the mobile bureau can have said intermediate support ledges 140, 142 possess at least one void in the intermediate support ledge 140, 142 to allow a connector 132, 134 for the plurality of said mobile devices 106, 104 to maintain connection with the plurality of mobile devices 106, 104 are still positioned screen out on the intermediate ledge 140, 142 of the front vertical surface of the easel support 101, where these connectors 132, 134 can be a data connector 130 or a power connector 146. Moreover, the easel support stand 144 can possess an separate computer or status display screen 124 incorporated into the easel support stand 144 for access to the Internet, display of emails or communications, status (time, date, weather, etc.) display, or word processing display.

The vertical support may be configured with a telescoping feature that is configured to extend and contract the height of the vertical support, which can raise or lower the easel support stand when the height of the vertical support is adjusted in this manner. Alternatively, or in combination with telescoping feature described above, the height of the vertical support can be fixed between thirty to seventy-two inches, and the easel support stand can be configured to slide or roll along the height of the vertical support to adjust the vertical position of the easel support stand. Using the telescoping feature of the vertical support, alone or in combination with the roller/slide feature of the easel support stand, allows the easel support stand to be positioned next to a table or desk, or alternatively adjusted upwardly to be positioned next to a higher table, bar or standing desk. The adjustable placement of the easel support stand next to a variety of desks allows the present invention to support tablets and telephones for viewing (or other written materials/books) next to the desk/table, and thereby maximize horizontal space on the desktop, table top or bar top by eliminating placement of those tablet and phone devices or written materials on those horizontal surfaces (while still allowing the worker to simultaneously view the displays on those devices).

The present invention shown in FIGS. 4-5 may also possess a plurality of castors 160 on said bottom surface of said second horizontal planar support 167 so the bureau can be moved in contact with the floor. Moreover, the front panel 165 may have a lock 172 to secure the front panel of the internal storage bin area. If locked, the internal storage bin may be locked by a combination dial lock, a timed lock, a key lock, a padlock, or a number/character entry lock, which can make the internal storage bin a secure safe or locker space. Also, the independent battery source may power 110-120V, 5-14V (USB or equivalent), or 15-35V power supplies through the outlet plugs in the device and system. A hanging hook 128 can be located on the back surface of said vertical bureau support 120 for supporting clothing items to be positioned on the mobile bureau, or one or more hanging hooks 128 can be located on the back surface of said vertical bureau support for supporting clothing items to be positioned on the mobile bureau.

A power outlet 146 can be located on the front surface of the vertical bureau support 120 in close proximity to the vertical bureau stand 101, or one or more power outlets 146 located on the front surface of the vertical bureau support 120 in close proximity to the easel support stand 101. A data outlet 130 can be positioned on said front vertical surface of said easel support stand 144, or one or more data outlets 130 can be positioned on said front vertical surface of said easel support stand 144.

Movement of the front panel 165 to the internal storage bin can be a sliding movement or a hinged pivot movement. One or more handles 110, 122 can be located on each of said left side edge and said right side edge, respectively, of said easel support stand 144 for maneuvering the mobile bureau. Also, a support ledge 114 can extend extends along the bottom edge of said easel support stand 144 to vertically support the placement of documents in ledge area 112 on the easel support stand 144 for viewing and review. The back surface of the vertical bureau stand can be covered by a banner or other vertical covering that possesses a faux wood pattern, school or company logo, promotional material or another banner design. This banner or vertical covering can allow the back surface of the present invention to be positioned and placed in a manner that would serve as the front surface of a lectern that faces a group or audience when the easel support is turned in the opposite direction from the support surface on the easel support.

As shown in FIGS. 4-5, the easel support stand 144 can allow some laptop computers, ipods, ipads and mobile phones to be connected to the Internet or the local area network through the data connection, without sacrificing the mobile computing functionality of the machine. These computer devices can dock and undock hot, cold or standby, depending on the capabilities of the system. In a cold dock or undock, one completely shuts the computer down before docking/undocking. In a hot dock or undock, the computer remains running when docked/undocked. Standby docking or undocking, an intermediate style used in some designs, allows the computer to be docked/undocked while powered on, but requires that it be placed into a sleep mode prior to docking/undocking.

The present invention is a method of fabricating composite membranes with a cross-linked dense layer, as well as the resulting membrane itself. The present method provides an approach for the fabrication of membranes with a new set of properties, and the present invention produces a new composite membrane from a unique phase inversion process. The present invention manufacturing method uses the advantages of composite membrane production, i.e., independent optimization of the support layer and the dense layer, with a more efficient use of expensive materials, such as cross linkers.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

While the invention has been described, disclosed, illustrated and shown in various terms of certain embodiments or modifications which it has presumed in practice, the scope of the invention is not intended to be, nor should it be deemed to be, limited thereby, and such other modifications or embodiments as may be suggested by the teachings herein are particularly reserved, especially as they fall within the breadth and scope of the claims here appended.

Having described the invention, I claim:

1. A mobile bureau, comprising:
  a lower storage support unit having:
    a first horizontal planar support having a first width and a second length, a top surface and a bottom surface and a third thickness, said top surface configured to provide a location to position baggage and briefcases,
    a second horizontal planar support having a fourth width and a fifth length, a top surface and a bottom surface and a sixth thickness, said bottom surface having a plurality of rolling castors so the bureau can be moved; and,
    a left sidewall, a right sidewall, and a back sidewall, each of said left sidewall, right sidewall, and back sidewall being vertically positioned between the bottom surface of the first horizontal planar support and the top surface of said second horizontal planar support and proximate to a peripheral edge of said first and second horizontal planar supports thereby forming an internal storage bin area between said first and second horizontal planar supports; and,
    a front panel vertically positioned between the bottom surface of the first horizontal planar support and the top surface of said second horizontal planar support and proximate to the peripheral edge of said first and second horizontal planar supports to provide a closing door to the internal storage bin area defined by said left sidewall, right sidewall, and back sidewall, said front panel having a movement to open and close an access to the internal storage bin area and a lock to secure the internal storage bin area, a battery power source and radio transceiver unit located in the internal storage bin area; and,
  a vertical bureau stand having:
    a vertical support extending vertically upward from the back sidewall to a seventh height above the top surface of the first horizontal planar support,
    an easel support stand located proximate to said vertical support and having a tenth width, an eleventh height and a twelfth thickness, a front vertical surface and a back vertical surface, a top edge, a bottom edge, a left side edge and a right side edge, said easel support stand having:
      one or more handles located on each of said left side edge and said right side edge, respectively, for maneuvering the mobile bureau;
      a support ledge that extends along the bottom edge of said easel support stand to vertically support the placement of documents on the easel support stand for viewing and review;
      a plurality of intermediate support ledges located above the support ledge and on the front vertical surface of the easel support stand, said intermediate support ledges having an intermediate ledge bottom edge to vertically support simultaneous placement of a plurality of mobile devices in a manner to allow simultaneous display of a corresponding display on each of said plurality of said mobile devices for view as positioned on the front vertical surface of said easel support stand; and,
      a data outlet positioned on said front vertical surface of said easel support stand;
    a power outlet located on the vertical support in close proximity to the easel support stand; and,
    a hanging hook located on the vertical support for supporting clothing items to be positioned on the mobile bureau.

2. The mobile bureau of claim 1, wherein said intermediate support ledges possess at least one void in the intermediate ledge bottom edge to allow a connector for the plurality of said mobile devices to maintain connection with the plurality of mobile device while still being positioned on the intermediate support ledge on the front vertical surface of the easel support.

3. The mobile bureau of claim 2, wherein said connector is a data connector.

4. The mobile bureau of claim 2, wherein said connector is a power connector.

5. The mobile bureau of claim 1 further comprising:
  a plurality of hanging hooks located on the back surface of said vertical bureau support for supporting clothing items to be positioned on the mobile bureau.

6. The mobile bureau of claim 1 further comprising:
  a plurality of power outlets located on the front surface of the vertical bureau support in close proximity to the easel support stand.

7. The mobile bureau of claim 1 further comprising:
  a plurality of data outlets positioned on said front vertical surface of said easel support stand.

8. The mobile bureau of claim 1 wherein said movement of the front panel to the internal storage bin is a sliding movement.

9. The mobile bureau of claim 1 wherein said movement of the front panel to the internal storage bin is a hinged pivot movement.

10. A mobile bureau, comprising:
  a lower storage support unit having:
    a first horizontal planar support having a first width and a second length, a top surface and a bottom surface and a third thickness, said top surface configured to provide a location to position baggage or briefcases, a second horizontal planar support having a fourth width and a fifth length, a top surface and a bottom surface and a sixth thickness; and, a left sidewall, a right sidewall, and a back sidewall, each of said left sidewall, right sidewall, and back sidewall being vertically positioned between the bottom surface of the first horizontal planar support and the top surface of said second horizontal planar support and proximate to the first horizontal planar support and said second horizontal planar support thereby forming an internal storage bin area between said first and second horizontal planar supports; and, a front panel vertically positioned between the bottom surface of the first horizontal planar support and the top surface of said second horizontal planar support and proximate to the first horizontal planar support and said second horizontal planar support to provide a closing door to the internal storage bin area defined by said left sidewall, right sidewall, and back sidewall, said front panel having a movement to open and close an access to the internal storage bin area, a battery power source and a remote radio transceiver unit located in the internal storage bin area; and, a vertical bureau stand having:

a vertical support extending vertically upward from the back sidewall to a seventh height above the first horizontal planar support, an easel support stand located proximate to the top of said vertical support and having a tenth width, an eleventh height and a twelfth thickness, a front vertical surface and a back vertical surface, a top edge, a bottom edge, a left side edge and a right side edge, said easel support stand having a plurality of intermediate support ledges located above a support ledge and on the front vertical surface of the easel support stand, said intermediate support ledges having an intermediate ledge bottom edge to vertically support simultaneous placement of a plurality of mobile devices in a manner to allow simultaneous display of a corresponding display on each of said plurality of said mobile devices for view as positioned on the front vertical surface of said easel support stand.

11. The mobile bureau of claim 10, wherein said intermediate support ledges possess at least one void to allow a connector for the plurality of said mobile devices to maintain connection with the plurality of mobile device while still being positioned on the intermediate ledge of the front vertical surface of the easel support.

12. The mobile bureau of claim 11, wherein said connector is a data connector coupled to said radio transceiver unit.

13. The mobile bureau of claim 11, wherein said connector is a power connector coupled to said battery power source.

14. The mobile bureau of claim 10 further comprising:
a plurality of castors on said bottom surface of said second horizontal planar support so the bureau can be moved.

15. The mobile bureau of claim 10 further comprising:
a lock to secure the front panel of the internal storage bin area.

16. The mobile bureau of claim 10 further comprising:
a hanging hook located on the back surface of said vertical bureau support for supporting clothing items to be positioned on the mobile bureau.

17. The mobile bureau of claim 10 further comprising:
a plurality of hanging hooks located on the back surface of said vertical bureau support for supporting clothing items to be positioned on the mobile bureau.

18. The mobile bureau of claim 10 further comprising:
a power outlet located on the front surface of the vertical bureau support in close proximity to the easel support stand.

19. The mobile bureau of claim 10 further comprising:
a plurality of power outlets located on the front surface of the vertical bureau support in close proximity to the easel support stand.

20. The mobile bureau of claim 10 further comprising:
a data outlet positioned on said front vertical surface of said easel support stand.

21. The mobile bureau of claim 10 further comprising:
a plurality of data outlets positioned on said front vertical surface of said easel support stand.

22. The mobile bureau of claim 10 wherein said movement of the front panel to the internal storage bin is a sliding movement.

23. The mobile bureau of claim 10 wherein said movement of the front panel to the internal storage bin is a hinged pivot movement.

24. The mobile bureau of claim 10 further comprising:
at least one handle located on each of said left side edge and said right side edge, respectively, of said easel support stand for maneuvering the mobile bureau.

25. The mobile bureau of claim 10 further comprising:
a support ledge that extends along the bottom edge of said easel support stand to vertically support the placement of documents on the easel support stand for viewing and review.

26. A method of making a mobile bureau, comprising the steps of:

providing a first horizontal planar support of a lower storage unit possessing a first width and a second length, a top surface and a bottom surface and a third thickness, providing a second horizontal planar support of said lower storage unit having a fourth width and a fifth length, a top surface and a bottom surface and a sixth thickness;

vertically positioning and affixing a left sidewall, a right sidewall, and a back sidewall of said lower storage unit between the bottom surface of the first horizontal planar support and the top surface of said second horizontal planar support such that each of said sidewalls is located proximate to a side edge and a back peripheral edge of said first and second horizontal planar supports to form an internal storage bin area between said first and second horizontal planar supports;

vertically positioning and affixing a front panel of said lower storage unit between the bottom surface of the first horizontal planar support and the top surface of said second horizontal planar support and proximate to a front peripheral edge of said first and second horizontal planar supports so as to provide a moveable door access to the internal storage bin area, affixing a vertical support having a front surface, a back surface, an eighth thickness and a ninth width vertically upward from the back sidewall of the lower storage unit to a seventh height above the top surface of the first horizontal planar support, affixing an easel support stand proximate to the vertical support, said easel support stand having a tenth width, an eleventh height and a twelfth thickness, a front vertical surface and a back vertical surface, a top edge, a bottom edge, a left side edge and a right side edge, positioning a plurality of intermediate support ledges on said easel support stand above the front vertical surface of the easel support stand, said intermediate support ledges having an intermediate ledge bottom edge to vertically support simultaneous placement of a plurality of mobile devices in a manner to allow simultaneous display of a corresponding display on each of said plurality of said mobile devices for view as positioned on the front vertical surface of said easel support stand.

27. The method of making the mobile bureau of claim 26, wherein said intermediate support ledges have at least one void to allow a connector for the plurality of said mobile devices to maintain connection with the plurality of mobile device while still being positioned on the intermediate ledge of the front vertical surface of the easel support.

28. The method of making the mobile bureau of claim 27, wherein said connector is a data connector.

29. The method of making the mobile bureau of claim 27, wherein said connector is a power connector.

30. The method of making the mobile bureau of claim 26 further comprising the steps of:

placing a plurality of castors on said bottom surface of said second horizontal planar support so the bureau can be moved.

31. The method of making the mobile bureau of claim 26 further comprising the steps of:

providing a lock to secure the front panel of the internal storage bin area.

32. The method of making the mobile bureau of claim 26 further comprising the steps of:

providing a hanging hook located on the back surface of said vertical bureau support for supporting clothing items to be positioned on the mobile bureau.

33. The method of making the mobile bureau of claim 26 further comprising the steps of:

providing a plurality of hanging hooks located on the back surface of said vertical bureau support for supporting clothing items to be positioned on the mobile bureau.

34. The method of making the mobile bureau of claim 26 further comprising the steps of:

providing a power outlet located on the front surface of the vertical bureau support in close proximity to the easel support stand.

35. The method of making the mobile bureau of claim 26 further comprising the steps of:

providing a plurality of power outlets located on the front surface of the vertical bureau support in close proximity to the easel support stand.

36. The method of making the mobile bureau of claim 26 further comprising the steps of:

providing a data outlet positioned on said front vertical surface of said easel support stand.

37. The method of making the mobile bureau of claim 26 further comprising the steps of:

providing a plurality of data outlets positioned on said front vertical surface of said easel support stand.

38. The method of making the mobile bureau of claim 26 wherein said movement of the front panel to the internal storage bin is a sliding movement.

39. The method of making the mobile bureau of claim 26 wherein said movement of the front panel to the internal storage bin is a hinged pivot movement.

40. The method of making the mobile bureau of claim 26 further comprising the steps of:

providing at least one handle located on each of said left side edge and said right side edge, respectively, of said easel support stand for maneuvering the mobile bureau.

41. The method of making the mobile bureau of claim 26 further comprising the steps of:

providing a support ledge that extends along the bottom edge of said easel support stand to vertically support the placement of documents on the easel support stand for viewing and review.

\* \* \* \* \*